US012119546B2

(12) United States Patent
Piche

(10) Patent No.: US 12,119,546 B2
(45) Date of Patent: Oct. 15, 2024

(54) SATELLITE PLATFORM HAVING IMPROVED CHARACTERISTICS IN RESPECT OF ELECTROMAGNETIC DECOUPLING BETWEEN RADIATING ELEMENTS AND CORRESPONDING CONSTRUCTION PROCESS

(71) Applicant: AIRBUS DEFENCE AND SPACE SAS, Toulouse (FR)

(72) Inventor: Alexandre Piche, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 18/573,190

(22) PCT Filed: Apr. 29, 2022

(86) PCT No.: PCT/EP2022/061499

§ 371 (c)(1),
(2) Date: Dec. 21, 2023

(87) PCT Pub. No.: WO2022/268384

PCT Pub. Date: Dec. 29, 2022

(65) Prior Publication Data

US 2024/0266719 A1 Aug. 8, 2024

(30) Foreign Application Priority Data

Jun. 24, 2021 (FR) ........................................ 2106798

(51) Int. Cl.
*H01Q 1/28* (2006.01)
*H01Q 1/52* (2006.01)
*H01Q 17/00* (2006.01)

(52) U.S. Cl.
CPC ............. *H01Q 1/288* (2013.01); *H01Q 1/525* (2013.01); *H01Q 1/526* (2013.01); *H01Q 17/002* (2013.01)

(58) Field of Classification Search
CPC ........ H01Q 1/288; H01Q 1/525; H01Q 1/526; H01Q 17/002
See application file for complete search history.

(56) References Cited

U.S. PATENT DOCUMENTS 6,097,327 A 8/2000 Byquist et al.
6,217,978 B1 4/2001 Murase et al.
(Continued)

FOREIGN PATENT DOCUMENTS

EP 2 863 473 A1 4/2015

OTHER PUBLICATIONS

International Search Report with English Translation for PCT/EP2022/061499, mailed Jul. 27, 2022, 7 pages.
(Continued)

*Primary Examiner* — Hai V Tran
*Assistant Examiner* — Michael M Bouizza
(74) *Attorney, Agent, or Firm* — Nixon & Vanderhye P.C.

(57) ABSTRACT

A satellite platform is disclosed having a plurality of radiating elements configured to receive and/or transmit electromagnetic radiation and including at least one transmitter radiating element, and at least one block of material that absorbs electromagnetic radiation in a frequency band of interest in order to decrease electromagnetic coupling between the radiating elements. The block of material is implemented in at least one region of interest in the satellite platform to decrease electromagnetic coupling, the region of interest intersecting at least one predominant coupling path between at least two of the radiating elements.

7 Claims, 3 Drawing Sheets

(56) References Cited

U.S. PATENT DOCUMENTS

| | | | | |
|---|---|---|---|---|
| 9,640,873 | B2 * | 5/2017 | Pfitzenmaier | H01Q 17/001 |
| 11,646,500 | B2 * | 5/2023 | Glise | H01Q 15/141 343/702 |
| 2015/0102975 | A1 * | 4/2015 | Braubach | H01Q 1/50 343/853 |

OTHER PUBLICATIONS

Written Opinion of the ISA for PCT/EP2022/061499, mailed Jul. 27, 2022, 11 pages.
International Preliminary Report on Patentability for PCT/EP2022/061499, dated Mar. 28, 2023, 18 pages.
Hwu Su et al., "Space station GPS multipath analysis and validation", Vehicular Technology Conference, Houston, Texas, 49th IEEE, vol. 1, May 16-20, 1999, pp. 757-761.
Goncalves Machado Gabriel et al., "Resistively Loaded FSS Clad Thermal Blankets for Enhanced RF Space Communications", 2019 International Conference on Electromagnetics in Advanced Applications (ICEAA), IEEE, Sep. 9, 2019, pp. 48-52.

* cited by examiner

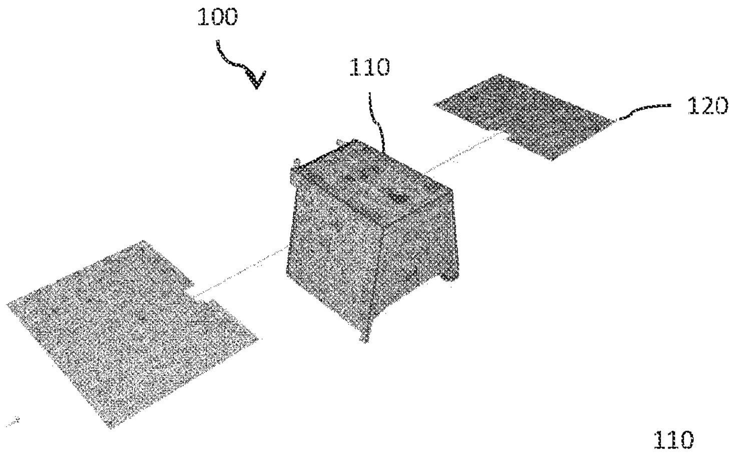
[Fig.1a]
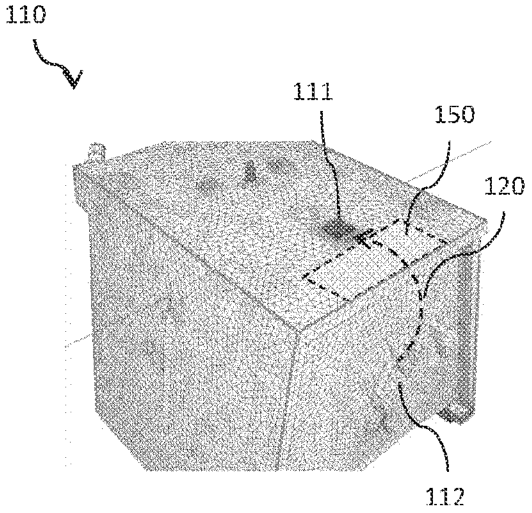
[Fig.1b1]
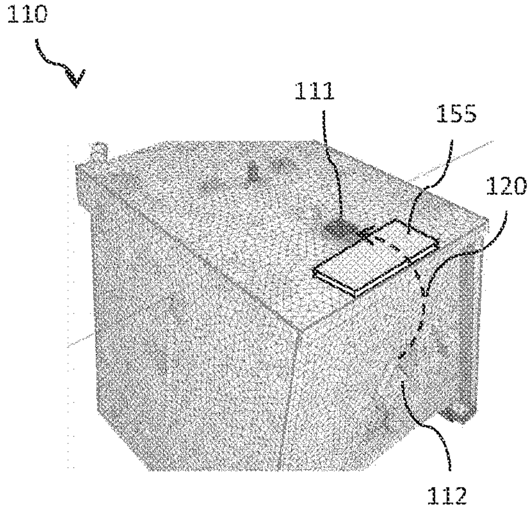
[Fig.1b2]

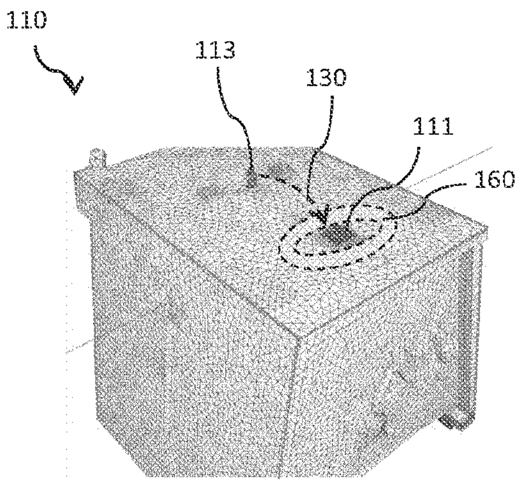
[Fig.1c1]
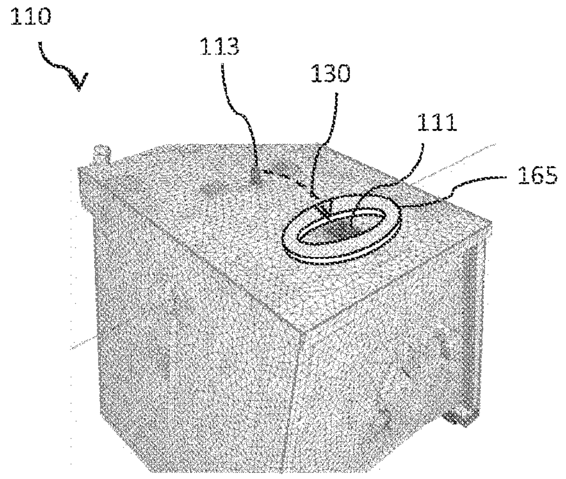
[Fig.1c2]

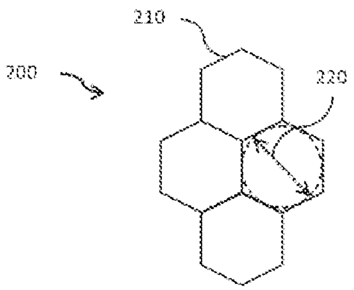
[Fig.2a]
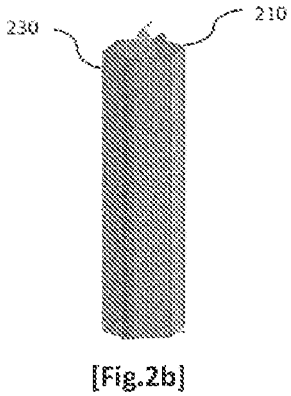
[Fig.2b]
[Fig.3]
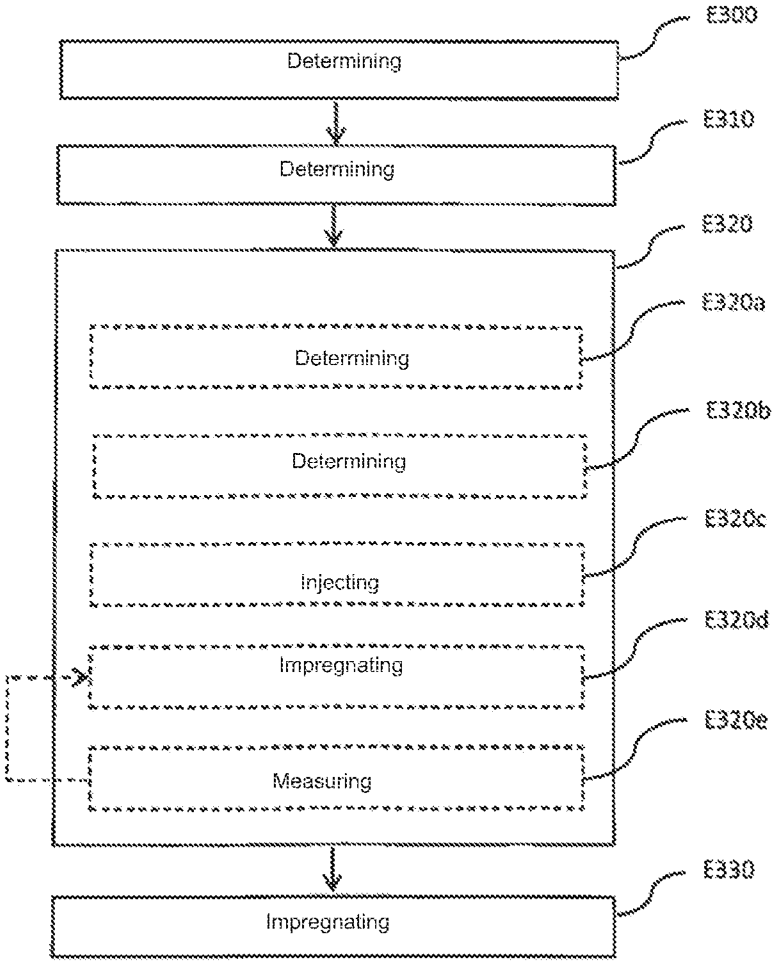

SATELLITE PLATFORM HAVING IMPROVED CHARACTERISTICS IN RESPECT OF ELECTROMAGNETIC DECOUPLING BETWEEN RADIATING ELEMENTS AND CORRESPONDING CONSTRUCTION PROCESS

CROSS REFERENCE TO RELATED APPLICATIONS

The present application is a National Phase of International Application Number PCT/EP2022/061499 filed Apr. 29, 2022, which designated the U.S. and claims priority benefits from French Application Number FR 2106798 filed Jun. 24, 2021, the entire contents of each of which are hereby incorporated by reference.

FIELD OF THE INVENTION

The field of the invention is that of satellite platforms.

More particularly, the invention relates to a satellite platform having improved electromagnetic decoupling characteristics between radiating elements of the platform.

Thus, the invention has applications, in particular, yet not exclusively, for all satellite platforms for which the electromagnetic couplings between radiating elements are a major problem, like, for example, satellite platforms with small dimensions.

PRIOR ART AND ITS DRAWBACKS

In the spatial industry, a growing interest for communication and observation satellites, and in particular for constellations of satellites comprising a multitude of small-sized satellites, is observed. As a non-limiting example, mention may be made of the Starlink, Kineis, OneWeb or C03D constellations. This growing interest is accompanied by a multiplication of the radiocommunications links and the operating frequencies implemented by the payload of the platform. This results in an increasing need for antennas to be accommodated in particular on platforms with decreased dimensions. The document EP2863473 filed on the name Airbus Defence and Space GMBH and entitled "Spaceborne antenna system", discloses a decoupling RF seal between two panels each having a radiation surface.

The present invention aims to further improve decoupling between electromagnetic radiation receiver and transmitter elements present on a satellite platform.

DISCLOSURE OF THE INVENTION

The invention relates to a satellite platform comprising a plurality of radiating elements of the electromagnetic radiation receiver and/or transmitter type, including at least one transmitter radiating element. Such a satellite platform comprises at least one block of electromagnetic absorbing material comprising a cellular material impregnated with an electromagnetic absorbing filled resin in a frequency band of interest to decrease electromagnetic coupling between the radiating elements. The block of material is implemented in at least one region of interest on the satellite platform to decrease electromagnetic coupling, the region of interest intersecting at least one predominant coupling path between at least two of said radiating elements.

In some embodiments, the block of electromagnetic absorbing material consists exclusively of the cellular material impregnated with the electromagnetic absorbing filled resin.

In some embodiments, the block of electromagnetic absorbing material is an affixed element such as an electromagnetic absorbent fastened to an outer surface of the satellite.

In some embodiments, the predominant path is of the direct type and corresponds to a direct view between the two radiating elements.

In some embodiments, the predominant path is of the indirect type corresponding to an indirect interaction between the two radiating elements.

In some embodiments, the predominant path corresponds to the path where the intensity of the electromagnetic field is higher than a determined threshold beyond which the risk of electromagnetic disturbance between the two radiating elements is significant.

In some embodiments, the frequency band of interest is an operating frequency band of a receiver system processing the wave captured by one of the two radiating elements. The electromagnetic absorbing material has an attenuation determined in the frequency band of interest so as to guarantee a predetermined level of performances of the receiver system.

In some embodiments, the region of interest extends over an external face of the satellite platform. The block of absorbing material, occupying the region of interest, has characteristic dimensions smaller than the largest dimension of the platform so as to achieve a local electromagnetic absorption.

In some embodiments, the cellular material has a mesh size comprised between 3 and 12 millimeters so as to be able to receive at least one surface layer of resin filled by impregnation according to an amount comprised between 5 kilograms and 150 kilograms per cubic meter, so that the block of absorbing material keeps a hollow structure.

In some embodiments, the filled resin comprises a phenolic resin, or an acrylic paint, filled with carbon black particles.

In some embodiments, the cell walls of the cellular material are arranged perpendicularly to an external face of the satellite platform.

The invention also relates to a process for constructing a satellite platform comprising a plurality of radiating elements of the electromagnetic radiation receiver or transmitter type, including at least one transmitter radiating element, characterized in that it comprises:

- a step of determining at least one predominant coupling path between at least two of the radiating elements;
- a step of determining at least one region of interest on the satellite platform to decrease electromagnetic coupling between the radiating elements so that the region of interest intersects the predominant path;
- a step of obtaining at least one block of a material electromagnetically absorbing in a frequency band of interest to decrease electromagnetic coupling between the radiating elements comprising at least one step of impregnating a cellular material with an electromagnetic absorbing filled resin; and
- a step of implementing the block of absorbing material in the region of interest.

In some embodiments, the step of determining the predominant path comprises calculating an electromagnetic coupling in the absence of absorbing material and comparing the electromagnetic coupling with a predetermined threshold to decide to implement a predetermined absorption treatment.

In some embodiments, the block of electromagnetic absorbing material consists exclusively of the cellular material impregnated with the electromagnetic absorbing filled resin.

In some embodiments, the electromagnetic absorbing resin is obtained by injecting carbon black particles into a phenolic resin or an acrylic paint.

In some embodiments, the step of obtaining the block of electromagnetic absorbing material comprises a step of determining a target permittivity for the block of electromagnetic absorbing material according to the predetermined absorption treatment.

In some embodiments, the step of obtaining the block of electromagnetic absorbing material comprises a step of determining, according to the target permittivity, at least one parameter from the group comprising:

- a mesh size of the cellular material;
- a particle charge rate of the resin;
- a concentration rate of carbon black particles;
- an amount of impregnated filled resin on said cellular material; and
- a sizing of said block of absorbing material.

In some embodiments, the cellular material is selected with a mesh size comprised between 3 and 12 millimeters to receive a surface layer of an electromagnetic absorbing resin by impregnation according to an amount comprised between 5 kilograms and 150 kilograms per cubic meter, so that the block of absorbing material keeps a hollow structure.

In some embodiments, the step of obtaining said block of electromagnetic absorbing material comprises a step of measuring the permittivity of said absorbing material electromagnetic followed, if the target permittivity is not reached, with a new impregnation step.

In some embodiments, the step of determining the region of interest comprises determining the size of said block of absorbing material and of said region of interest extending over an external face of the satellite platform. The block of absorbing material, occupying the region of interest, has characteristic dimensions smaller than the largest dimension of the platform so as to achieve a local electromagnetic absorption.

The invention also relates to a process for constructing a satellite platform comprising a plurality of radiating elements of the electromagnetic radiation receiver or transmitter type, including at least one transmitter radiating element, characterized in that it comprises:

- a step of determining at least one predominant coupling path between at least two of the radiating elements comprising calculating the electromagnetic coupling in the absence of any absorbing material and comparing the electromagnetic coupling with a predetermined threshold to decide to implement a predetermined absorption treatment;
- a step of determining at least one region of interest on the satellite platform to decrease electromagnetic coupling between the radiating elements so that the region of interest intersects the predominant path;
- a step of obtaining at least one block of a material electromagnetically absorbing in a frequency band of interest to decrease electromagnetic coupling between the radiating elements comprising a step of determining a target permittivity for the block of electromagnetic absorbing material according to the predetermined absorption treatment; and
- a step of implementing the block of absorbing material in the region of interest.

For example, such a satellite platform obtained by implementation of the construction process according to the invention is a satellite platform as described before (according to any one of the aforementioned embodiments).

Advantageously, the invention improves the decoupling between intentional or unintentional electromagnetic radiation receiver and transmitter elements, such as the antennas of communication systems or the elements of Hall effect motors, through the use of a material having electromagnetic absorption characteristics in a corresponding frequency band. More particularly, such a material is herein implemented in a region of interest in order to obtain the desired decrease.

Another advantage of the invention is that it is possible to cut off a path between two radiating elements where, in particular, creeping waves propagate along one face of the satellite, in direct view to cut off a direct coupling path or in indirect view to cut off an indirect coupling path by reflection, diffraction, dual diffraction or scattering.

Still advantageously, the cellular material, for example based on an aramid such as honeycomb Nomex®, may have a mesh size particularly suited to aeronautical and space applications. Moreover, such a material can be easily filled with an electromagnetic absorbing resin.

LIST OF THE FIGURES

Other aims, features and advantages of the invention will appear more clearly upon reading the following description, given as a simple illustrative and non-limiting example, with reference to the figures, wherein:

FIG. 1*a* shows a satellite platform according to an embodiment of the invention;

FIG. 1*b*1 shows a partial detailed view of the docking structure of the platform of FIG. 1*a* according to a first embodiment of the invention;

FIG. 1*b*2 shows a detailed view of the docking structure of the platform of FIG. 1*a* complementary to FIG. 1*b*1;

FIG. 1*c*1 shows a partial detailed view of the docking structure of the platform of FIG. 1*a* according to a second embodiment of the invention;

FIG. 1*c*2 shows a detailed view of the docking structure of the platform of FIG. 1*a* complementary to FIG. 1*c*1;

FIG. 2*a* shows a top view of an electromagnetic absorbing material comprising a cellular material impregnated with an electromagnetic absorbing filled resin according to an embodiment of the invention;

FIG. 2*b* shows a side view of a cell of the material of FIG. 2*a*; and

FIG. 3 illustrates the steps of a process for constructing a satellite platform according to an embodiment of the invention.

DETAILED DESCRIPTION OF EMBODIMENTS OF THE INVENTION

The radiofrequency electromagnetic couplings increase because of the proximity between the different antenna accesses on platforms with decreased dimensions, this tendency being aggravated in particular at low frequencies.

Moreover, a generalization of the electric propulsion through the use of Hall effect motors is also noticed for such satellite platforms. These motors are a first order broadband electromagnetic noise source for onboard receivers, particularly at low frequencies (typically for frequencies ranging from the VHF band to the S band).

The use of such electric motors associated with increasingly close radio frequency transmitters and receivers leads to new electromagnetic compatibility problems at such satellite platforms. Moreover, such problems are aggravated on satellite platforms with decreased dimensions as mentioned hereinabove.

The general principle of the invention is based in particular on the implementation of an electromagnetic absorbing material comprising a cellular material impregnated with a filled resin electromagnetically absorbing in a frequency band of interest to decrease electromagnetic coupling between radiating elements of the electromagnetic radiation receiver and/or transmitter type on a satellite platform. More particularly, the material is implemented in at least one region of interest of the satellite platform to decrease electromagnetic coupling. Such a region of interest intersects one or more predominant coupling path(s) between several radiating elements. Thus, the electromagnetic coupling is decreased to an acceptable threshold.

The expression "frequency band of interest" herein refers to the frequency band in which a decrease in the electromagnetic coupling between the considered radiating elements has an interest with regards to the improvement of the operating performances of the radiofrequency transmitters and/or receivers associated with all or part of the considered radiating elements. Moreover, by "electromagnetic absorbing material", it should be understood any material attenuating the electromagnetic waves propagating along the considered coupling path in a given frequency band, in this case the frequency band of interest. For example, such an attenuation is obtained within the mere absorbing material by dissipation of the electromagnetic energy into thermal energy.

Referring to FIG. 1*a*, FIG. 1*b*1 and FIG. 1*b*2, a satellite platform 100 according to a first embodiment of the invention is now described.

More particularly, the satellite platform 100 comprises a docking structure 110 intended to accommodate the main functional subassemblies of the satellite (for example the flight or propulsion control system), as well as deployable solar panels 120.

In some embodiments, other satellite platform structures are considered, for example with other energy sources than solar panels.

Returning back to FIG. 1*b*1 and FIG. 1*b*2, the docking structure 110 further comprises a receiving antenna 111 (for example a GPS receiving antenna (standing for "Global Positioning System") as well as an electromagnetic radiation transmitter element, in this case the output 112 of a Hall-effect electric motor. The electric motor produced during operation thereof a broadband electromagnetic noise having a non-zero component at the reception frequency of the antenna 111, for example in a frequency band comprising the GPS reception frequencies, i.e. 1,575.42 MHz and 1,227.60 MHz.

More particularly, the electromagnetic coupling between the output 112 and the antenna 111 would predominantly take place via the coupling path 120. In practice, such a predominant coupling path 120 corresponds to a path where the intensity of the electromagnetic field is higher than a determined threshold. For example, such a threshold is defined as a threshold beyond which the risk of electromagnetic disturbance of the antenna 111 via the output 112 is significant, i.e. has a significant impact on the reception performances of the receiver system processing the signals received via the antenna 111.

According to such an example, the frequency band of interest corresponds to the operating frequency band of the GPS receiver, i.e. a band comprising the frequencies 1,575.42 MHz and 1,227.60 MHz. The electromagnetic absorbing material has a determined attenuation in the considered frequency band so as to guarantee a predetermined level of performances of the GPS system, for example with regards to the quality of reception parameters such as the SNR (standing for "Signal to Noise Ratio") or the BER (standing for "Bit Error Rate"). The same approach may be followed for any receiver system processing a wave captured by a radiating element subjected to an electromagnetic disturbance induced by a transmitter radiating element of the satellite platform. For example, the block of electromagnetic absorbing material induces an attenuation of at least 5 dB, for example in the L and S bands.

In the case illustrated in FIG. 1*b*1 and FIG. 1*b*2, the predominant path 120 is of the indirect type, which corresponds to an indirect interaction between the output 112 and the antenna 111. The output 112 and the antenna 111 are herein located on distinct faces of the docking structure 110. In some embodiments, such a predominant path is of the direct type and corresponds to a direct view between a radiating element of the electromagnetic radiation transmitter type and a radiating element of the electromagnetic radiation receiver type.

In general, a satellite platform according to the invention comprises a plurality of radiating elements of the electromagnetic radiation receiver and/or transmitter type, including at least one transmitter. More particularly, such electromagnetic radiation is intentional or unintentional. For example, the considered radiating elements consist of antennas of communication systems as well as Hall-effect motors as described hereinabove.

Returning back to FIG. 1*b*1 and FIG. 1*b*2, in order to decrease the electromagnetic coupling between the output 112 and the antenna 111, a block 155 of electromagnetic absorbing material is implemented in a region of interest of the satellite platform 100 for decreasing the considered electromagnetic coupling. The region of interest is positioned on an area 150 at the surface of the platform so as to intersect the predominant coupling path 120 between the output 112 and the antenna 111. More particularly, the region of interest covers at least one portion of an external face of the satellite platform 100. The parallelepiped shaped block 155 of absorbing material has characteristic dimensions smaller than the largest dimension of the docking structure 110 so as to achieve a local electromagnetic absorption.

Indeed, the coupling paths correspond to parasitic radiation phenomena inducing waves propagating in particular along the conductive external surfaces of the satellite platform 100.

Thus, a coupling path, for example of the creeping path type, could appear between two radiating elements, even implanted on different faces of the satellite platform 100. In general, the external partition of the satellite platform 100 tends to guide this parasitic wave.

Thus, it is possible, for example, to cut off a path where creeping waves propagate along one face of the satellite, in direct view (i.e. a direct coupling path) or in indirect view (i.e. an indirect coupling path by reflection, dual diffraction or scattering).

In some embodiments, the block of absorbing material takes on other shapes, for example a ring or lozenge like shape.

For example, FIG. 1*c*1 and FIG. 1*c*2 illustrate a second embodiment of the docking structure 110 wherein the coupling path 130 is of the direct type and corresponds to a direct view between the receiving antenna 111 and an antenna 113 of a communication system comprising a transmitter portion. Moreover, the block 165 of electromagnetic absorbing material is implemented in a region of interest on an area 160 of the satellite platform 100 to decrease electromagnetic coupling between the receiving antenna 111 and the antenna 113 of the communication system. According to this example, the block 165 of electromagnetic absorbing material has an elliptical profile.

In some embodiments wherein the satellite platform 100 comprises different radiating elements of the electromagnetic radiation receiver and/or transmitter type, several coupling paths between different radiating elements may exist. Thus, different blocks with the same geometry or with different geometries, and with the same dimensions or with different dimensions, of absorbing materials may be implemented in different regions of interest of the satellite platform. These blocks of materials may have identical or distinct radiofrequency absorption characteristics, for example with absorptions optimized for different frequency bands.

Returning back to FIG. 1*b*1 and FIG. 1*b*2, the material electromagnetically absorbing in a frequency band of interest to decrease electromagnetic coupling between the radiating elements 112 and 111, for example a frequency band comprising the frequencies 1,575.42 MHz and 1,227.60 MHz as discussed hereinabove.

According to the embodiment of FIG. 2*a* and FIG. 2*b*, the block 155, 165 of absorbing material is formed starting from a material 200 comprising a cellular material 210, also referred to as a "honeycomb" material, impregnated with an electromagnetic absorbing filled resin.

More particularly, the cellular material 210 has a mesh size 220 of a few millimeters, for example from 3 to 12 millimeters, in order to be able to receive one or more surface layer(s) of resin filled by impregnation. For example, the amount of impregnated resin is comprised between a few kilograms, for example 5 kilograms, and 150 kilograms per cubic meter. Thus, the block of absorbing material keeps a hollow structure. Moreover, such a resin filler allows obtaining good electromagnetic absorption performances without the material 200 becoming conductive.

For example, the cellular material 210 has a mesh size 220 of 4.6 mm, 6.4 mm or 9.6 mm particularly suited to aeronautical and space applications. For example, the height of the cells is 5 cm. For example, such a cellular material 210 is based on aramid such as for example Nomex®.

In some embodiments, the block of electromagnetic absorbing material consists exclusively of the cellular material 210 impregnated with the electromagnetic absorbing filled resin. In some embodiments, the filled resin comprises a phenolic resin, or an acrylic paint, filled with carbon black particles. For example, the charge rate is preferably between 5 and 20% by weight, even more preferably between 6 and 12% by weight, in order to obtain good electromagnetic absorption performances.

In some embodiments, the cell walls 230 of the cellular material 210 are arranged perpendicularly to an external face of the satellite platform 100. Advantageously, this leads to better decoupling performances. By passing from cells oriented along an external face to cells oriented normally to the external face, such an improvement is for example in the range of 5 dB in the L and S band, and more than 10 dB in the X band and beyond.

For example, the satellite platform 100 is obtained by implementation of the construction process now described with reference to FIG. 3.

Considering more particularly the embodiment of the satellite platform 100 of FIG. 1*b*1 and FIG. 1*b*2 as a non-limiting example, during a step E300, the predominant coupling path 120 between the output 112 and the antenna 111 is determined.

For example, a calculation of the electromagnetic coupling between the output 112 and the antenna 111 is implemented in the absence of absorbing material. For example, such a calculation is carried out by numerical simulation based on a 3D model of the satellite platform 100, or at least of the docking structure 110. Thus, each electromagnetic coupling is determined by calculation and compared with a predetermined threshold in order to decide whether this path 120 is a predominant path or not as described hereinabove with reference to FIG. 1*a*, FIG. 1*b*1 and FIG. 1*b*2.

In particular, the comparison allows deciding to implement an absorption treatment, in order to decrease the coupling between the output 112 and the antenna 111. In other words, when the electromagnetic coupling between the output 112 and the antenna 111 is greater than the predetermined threshold, it is decided to implement the considered treatment.

In other embodiments, the predominant coupling path 120 between the output 112 and the antenna 111 is determined in another manner, for example empirically, or based on measurements obtained on previous implementations, like for example in the case of satellite platforms produced in series.

Returning back to FIG. 3, during a step E310, at least one region of interest is determined so that the region of interest intersects at least one predominant path 120 determined during the implementation of step E 300. For example, the region of interest is positioned on an area 150 intersecting a creeping path where creeping waves propagate along one face of the satellite, in direct view or in indirect view, the region of interest extending over an external face of the satellite platform.

For example, step E310 comprises determining the size of a block 155 of absorbing material to be implemented in the region of interest. Such a block 155 of absorbing material, parallelepiped shaped, has characteristic dimensions smaller than the largest dimension of the docking structure 110 so as to achieve a local electromagnetic absorption.

In some embodiments, the block of absorbing material takes on other shapes, for example a ring like shape. It is possible to consider blocks of electromagnetic absorbing material having an oval or lozenge profile. An example of an oval surface 160 where creeping waves propagate is for example shown in FIG. 1*c*1.

Returning back to FIG. 3, during a step E320, the block 155, 165 of electromagnetic absorbing material is manufactured in a frequency band of interest to decrease electromagnetic coupling between the radiating elements 112 and 111.

Thus, during a step E320*a*, a target permittivity for the block 155, 165 of electromagnetic absorbing material is determined according to the desired predetermined absorption treatment. In other words, the target permittivity is determined, for example by electromagnetic simulation, so as to obtain desired absorption properties for the absorbing material.

In some embodiments, step E320*a* is not implemented and the target permittivity is already known, for example empirically or based on previous implementations.

As described hereinabove with reference to FIG. 2*a* and FIG. 2*b*, the block 155, 165 of material 200 implemented on the satellite platform 100 comprises a (or consists exclusively of a) cellular material 210 impregnated with an electromagnetic absorbing filled resin. For example, the filled resin comprises a phenolic resin, or an acrylic paint, filled with carbon black particles.

Thus, during a sizing step E320*b*, in FIG. 3, one or more parameter(s) of the electromagnetic absorbing material 200 are for example obtained according to the target permittivity, for example by electromagnetic simulation or empirically based on previous implementations. For example, this or these parameter(s) belong(s) to the group comprising:

- a mesh size 220 of the cellular material 210;
- a particle charge rate of the resin;
- a concentration rate of carbon black particles;
- an amount of impregnated filled resin on the cellular material; and
- a sizing of the block of absorbing material including for example its thickness and its extent in a plane parallel to the implementation face.

For example, the cellular material is selected with a mesh size of a few millimeters, for example from 3 to 12 millimeters, to receive a surface layer of an electromagnetic absorbing resin by impregnation in an amount comprised between a few kilograms, for example 5 kilograms, and 150 kilograms per cubic meter, so that the block of absorbing material keeps a hollow structure.

During a step E320*c* of manufacturing the resin, the electromagnetic absorbing resin is obtained by injecting carbon black particles into a phenolic resin or into an acrylic paint, depending on the parameter(s) obtained upon implementation of the sizing step E320*b*.

During a next step E320*d*, the cellular material 210 is impregnated with the electromagnetic absorbing filled resin obtained during the previous step E320*c*. For example, such an impregnation is done by soaking or gun spraying.

In some embodiments, the step E320*c* of manufacturing the resin is not implemented, the filled resin, being for example obtained from a supplier.

Returning back to FIG. 3, during a next step E320*e*, the permittivity of the impregnated cellular material 210 is for example measured. Such a measurement is typically performed after drying of the cellular material 210 impregnated with the filled resin. For example, such a measurement implements two waveguides between which a sample of the material is arranged. Thus, the permittivity of the material is estimated through comparison between the incident wave on the sample and the wave received after passage in the sample.

The measurement thus obtained is compared with the target permittivity. For example, if the target permittivity is not reached, a new impregnation step E320*d* is for example implemented. Thus, the measurement performed during step E320*e* is an intermediate measurement or, where appropriate, a final measurement.

After manufacture of the block 155, 165 of absorbing material, during a step E330, the block 155, 165 of absorbing material is implemented in the region of interest over a determined area 150, 160 of one face of the platform. For example, the block of material is fastened on the external partition of the satellite platform 100 by gluing, using brackets or using a mechanical holding structure.

The block of electromagnetic absorbing material is an affixed element such as a radiofrequency absorbent fastened to an outer surface of the satellite. Thus, the block of electromagnetic absorbing material has no support function. The block of electromagnetic absorbing material is not a structural element like a partition delimiting the interior of the satellite or a support structural element.

In some embodiments, the cell walls 230 of the cellular material 210 are arranged perpendicularly to an external face of the satellite platform 100. This advantageously leads to better decoupling performances.

In some embodiments, the steps E320*a* of determining the target permittivity, E320*b* of dimensioning the block and/or E320*e* of measuring are not necessarily implemented, in particular when the composition of the absorbing material to be obtained is already known. Thus, all it remains then is to manufacture it by implementing the resin manufacturing E320*c* and impregnation E320*d* steps.

Thus, in general, the implementation of the process of FIG. 3 allows constructing a satellite platform according to any one of the embodiments described hereinabove with reference to FIG. 1*a*, FIG. 1*b*1, FIG. 1*b*2, FIG. 1*c*1, FIG. 1*c*2, FIG. 2*a* and FIG. 2*b*.

In particular, in the aforementioned embodiments wherein the satellite platform comprises different radiating elements of the electromagnetic radiation receiver and/or transmitter type and wherein there is a plurality of coupling paths between different radiating elements, the different steps of the above-described construction process (according to any one of the aforementioned embodiments) may be implemented several times for different couplings existing between two radiating elements of the satellite platform. In this manner, several blocks of absorbing materials could be implemented in different regions of interest of the platform.

The invention claimed is:

1. A process for constructing a satellite platform comprising a plurality of radiating elements of the electromagnetic radiation receiver or transmitter type, including at least one transmitter radiating element, the process comprising:

determining at least one predominant coupling path between at least two of said radiating elements;

determining at least one region of interest on said satellite platform to decrease electromagnetic coupling between the radiating elements so that said region of interest intersects said predominant path;

obtaining at least one block of a material electromagnetically absorbing in a frequency band of interest to decrease electromagnetic coupling between the radiating elements comprising at least one act of impregnating a cellular material with an electromagnetic absorbing filled resin; and implementing the at least one block of absorbing material in the at least one region of interest, wherein the determining the at least one predominant coupling path comprises calculating an electromagnetic coupling in the absence of absorbing material and comparing the electromagnetic coupling with a predetermined threshold to decide to implement a predetermined absorption treatment, and wherein the obtaining the at least one block of electromagnetic absorbing material comprises determining a target permittivity for the at least one block of electromagnetic absorbing material according to the predetermined absorption treatment.

2. The process according to claim 1, wherein the at least one block of electromagnetic absorbing material consists exclusively of the cellular material impregnated with the electromagnetic absorbing filled resin.

3. The process according to claim 1, wherein the electromagnetic absorbing resin is obtained by injecting carbon black particles into a phenolic resin or an acrylic paint.

4. The process according to claim 3, wherein the obtaining the at least one block of electromagnetic absorbing material comprises determining, according to the target permittivity, at least one parameter from the group comprising:

a mesh size of said cellular material;

a particle charge rate of said resin;

a concentration rate of carbon black particles;

an amount of impregnated filled resin on said cellular material; and a sizing of said block of absorbing material.

5. The process according to claim 4, wherein obtaining the at least one block of electromagnetic absorbing material comprises measuring the permittivity of said absorbing material electromagnetic followed, if the target permittivity is not reached, with a new act of impregnation.

6. The process according to claim 1, wherein the cellular material is selected with a mesh size comprised between 3 and 12 millimeters to receive a surface layer of an electromagnetic absorbing resin by impregnation according to an amount comprised between 5 kilograms and 150 kilograms per cubic meter, so that the block of absorbing material keeps a hollow structure.

7. The process according to claim 1, wherein the determining the at least one region of interest comprises determining the size of the at least one block of absorbing material and of the at least one region of interest extending over an external face of the satellite platform, the at least one block of absorbing material, occupying the region of interest, having characteristic dimensions smaller than the largest dimension of the platform so as to achieve a local electromagnetic absorption.

* * * * *